United States Patent
Cernasov

(10) Patent No.: US 7,602,427 B2
(45) Date of Patent: Oct. 13, 2009

(54) IMAGE SENSOR THAT PROVIDES RAW OUTPUT COMPRISING COMPRESSED DATA

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 443 days.

(21) Appl. No.: 11/482,035

(22) Filed: Jul. 7, 2006

(65) Prior Publication Data

US 2008/0007636 A1    Jan. 10, 2008

(51) Int. Cl.
  *H04N 5/335* (2006.01)
  *H04N 7/12* (2006.01)
(52) U.S. Cl. .................. 348/273; 375/240.29
(58) Field of Classification Search .............. 348/218.1, 348/228.1, 229.1, 241, 255, 273, 333.11; 375/240.29
See application file for complete search history.

(56) References Cited

U.S. PATENT DOCUMENTS

| 5,291,044 A | 3/1994 | Gaboury |
| 5,414,464 A | 5/1995 | Sasaki |
| 6,509,927 B1 | 1/2003 | Prater |
| 6,614,473 B1 | 9/2003 | Kijima |
| 6,614,483 B1 | 9/2003 | Lee |
| 6,786,411 B2 | 9/2004 | Chen |
| 7,233,354 B2 * | 6/2007 | Voss et al. ................... 348/308 |
| 7,420,607 B2 * | 9/2008 | Ota et al. .................... 348/315 |
| 2002/0085107 A1 | 7/2002 | Chen |
| 2003/0113013 A1 | 6/2003 | Hammadou |
| 2004/0041221 A1 | 3/2004 | Boon |
| 2004/0042668 A1 | 3/2004 | Kaplinsky |
| 2004/0084741 A1 | 5/2004 | Boon |
| 2004/0135903 A1 | 7/2004 | Brooks |
| 2004/0145672 A1* | 7/2004 | Sugimoto ................... 348/363 |
| 2005/0089239 A1 | 4/2005 | Brajovic |
| 2007/0127040 A1* | 6/2007 | Davidovici ................. 356/629 |

* cited by examiner

*Primary Examiner*—Tuan V Ho
*Assistant Examiner*—Joel Fosselman
(74) *Attorney, Agent, or Firm*—Ingrassia Fisher & Lorenz, P.C.

(57) ABSTRACT

An image sensor is configured to output transformed image data. The image sensor includes a set of pixel sensors that are sensitive to light and a set of filter elements positioned adjacent to the set of pixel sensors. The set of filter elements transforms light striking the set of pixel sensors to enable the image sensor to output transformed image data.

17 Claims, 6 Drawing Sheets

IMAGE SENSOR THAT PROVIDES RAW OUTPUT COMPRISING COMPRESSED DATA

FIELD

This disclosure generally relates to image sensors. More particularly, the subject matter of this disclosure pertains to image sensors that are capable of outputting compressed data in their raw output.

BACKGROUND

In a digital imaging device, such as a digital camera, light is focused on a digital image sensor. Most digital cameras use either a charge-coupled device (CCD), or complementary metal oxide semiconductor (CMOS) chip, as an image sensor. When a picture is taken, the image sensor samples the light coming through the lens and converts it into electrical signals. Typically, these signals are boosted by an amplifier and sent to an analog-to-digital converter (ADC) that changes those signals into digital data. An onboard processor then processes the digital data to produce the final image data, which may be stored on a memory card or sent as a file.

Most digital imaging devices use 12- or 14-bit ADCs and perform a wide variety of processing on the digital data, such as de-mosaicing, white balance, noise reduction, and the like. This processing can consume a significant amount of power and time to perform.

In addition, almost all conventional devices default to saving images in Joint Photographic Experts Group (JPEG) format, which is a compressed format. As a result, a digital imaging device down samples the original 12- or 14-bit data back down to 8 bits before performing the JPEG compression. In addition, the processor in the digital image device must perform a large set of calculations on the digital data for JPEG compression. Indeed, some digital imaging devices may include a separate digital signal processor or other form of processor in order to perform JPEG compression. Therefore, support of the JPEG algorithm can consume a large amount of time and power in a digital imaging device.

It may be desirable to reduce the amount processing and power required for JPEG images. Due to their popular acceptance, JPEG images can be generated and handled by a wide variety of devices. For example, devices like video cameras, mobile phones, etc., are now capable of providing JPEG images. JPEG images are also basic components of compressed video standards such as Moving Pictures Experts Group (MPEG). However, these devices must also conserve space used by the components and the amount of power they consume (since they run on batteries). It may also be desirable to speed the processing related to JPEG images or MPEG video, such as, for a security camera.

Accordingly, it would be desirable to systems and methods that efficiently implement compression algorithms to produce an image, such as a JPEG image. It may also be desirable to provide systems and methods that can acquire a compressed image, such as a JPEG image, more quickly than conventional technologies.

SUMMARY

Embodiments of the present teaching are directed to an image sensor configured to output transformed image data. The image sensor comprising a set of pixel sensors that are sensitive to light, and a set of filter elements positioned adjacent to the set of pixel sensors. The set of filter elements transforms light striking the set of pixel sensors to enable the image sensor to output transformed image data.

Embodiments also are directed to an imaging device configured to provide transformed image data by transforming light captured by the imaging device. The imaging device comprises a set of sensors that are sensitive to light. The sensors are arranged in sensor blocks, such as 8×8 sensor blocks, and each sensor of the set of sensors comprises sub-divisions. The imaging device also comprises a set of filter elements positioned adjacent to the set of sensors. Each filter element of the set of filter elements comprises sub-divisions corresponding to the sub-divisions in an adjacent sensor. The imaging device also comprises a set of measuring circuits coupled to the set of sensors. Each measuring circuit is coupled to corresponding sub-divisions of different sensors in a pixel block.

Embodiments are also directed to a method of providing an image in transformed form. The method comprises passing light for an image through a set of filter elements to a set of pixel sensors. The set of filter elements transforms light striking the set of pixel sensors to enable the image sensor to output transformed image data. The method also comprises gathering data from the set of pixel sensors based on the light passed through the set of filter elements and providing the transformed data as raw output from the sensor array.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the present teaching and together with the description, serve to explain the principles of the invention.

DETAILED DESCRIPTION

Figure 1:
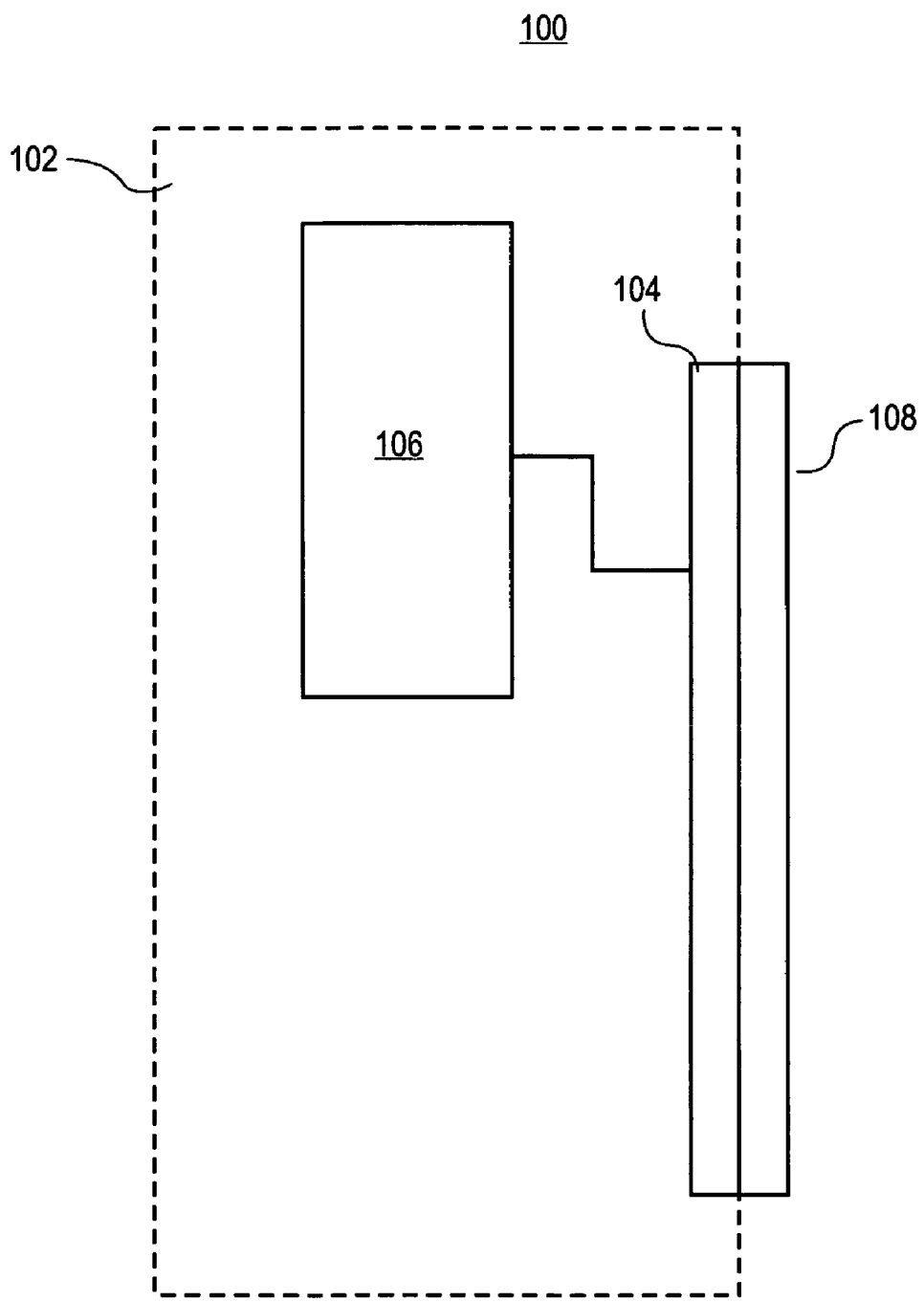
FIG. 1 is a diagram illustrating an exemplary imaging device consistent with embodiments of the present teaching.

As noted above, in conventional devices, an image detected by an image sensor is converted into digital form and then uses "back-end" processing to compress the image into a desired format, such as a JPEG image. Unfortunately, this type of "back-end" processing often requires the use of a separate digital signal processor to perform the calculations necessary for the compression algorithm, such as JPEG compression algorithm for still images or MPEG compression algorithm for moving images. This is in turn causes conventional devices to consume a large amount of power, take long times to acquire an image, and increases the size of the device.

However, embodiments of the present teaching provide an image sensor that implements "front-end" processing to perform part of a compression algorithm when acquiring an image. In particular, the image sensor is configured to provide an output that is proportional to transformation coefficients used by the compression algorithm directly as part of its raw output. The transformation coefficients may be whole transformation coefficients or partial coefficients.

According to embodiments of the present teaching, the image sensor includes filters that implements "front end" processing. The filters transform light striking a set of sensors of the image sensor, which allows the sensors to generate data that represents transformation coefficients or partial coefficients of a compression algorithm.

Particularly, each sensor of the image sensor, for example each physical pixel, is subdivided into sub-divisions, e.g. sub-pixels. The number of sub-divisions corresponds to the number of transformation coefficients or partial coefficients used by the compression algorithm. The filters (or portion of the filter) in front of each sub-divisions has a transmissivity related to transformation coefficient or partial coefficients of that sub-division.

To determine the coefficients or partial coefficients, the contribution of each sub-division for a block of sensors is summed. For example, corresponding pixel sub-divisions in different pixels sensors of an 8×8 pixel block are summed. Since the filter (or portion) is related to the respective transformation coefficient or partial coefficient of that sub-division, the summed contribution of each sub-division would be equal to the transform coefficient or partial coefficient. As such, the data captured by the image sensor would represent data for a compressed image.

In addition, in order to simplify the image sensor, a reduced or compressed number of transformation coefficients or partial coefficients (such as 20) may be used.

By using "front-end" processing, embodiments of the present teaching can be implemented using less power, less memory, reduced physical size, and less bandwidth for transmitting the images. In addition, such "front-end" processing may significantly reduce or even eliminate acquisition delays of an image.

Reference will now be made in detail to the present exemplary embodiments of the present teaching, examples of which are illustrated in the accompanying drawings. Wherever possible, the same reference numbers will be used throughout the drawings to refer to the same or like parts.

FIG. 1 illustrates an image sensor 100 consistent with embodiments of the present teaching. Image sensor 100 includes an imaging unit 102 and a filter 108. It should be readily apparent to those of ordinary skill in the art that image sensor 100 illustrated in FIG. 1 represents a generalized schematic illustration and that other components may be added or existing components may be removed or modified.

Imaging unit 102 may be any type of image detecting device capable of capturing light and converting the captured light into any electrical signal. As illustrated in FIG. 1, imaging unit 102 may include a sensor array 104 and processing device 106. Imaging unit 102 captures light and stores the captured light as data representing an object. Light strikes sensor array 104 producing a signal. Sensor array 104 may be a set of sensors, such as a set of pixel sensors, for capturing different sections of light. For example, sensor array 104 may be an array of semiconductor light sensor elements, such as photodiodes.

Processing device 106 receives a signal from sensor array 104 and performs processing on the signal from sensor array 104. Processing device 106 may also store the signal. Processing device 106 may be any hardware, firmware, software or combination thereof capable of receiving a signal from sensor array 104 and processing the signal.

Figure 2:
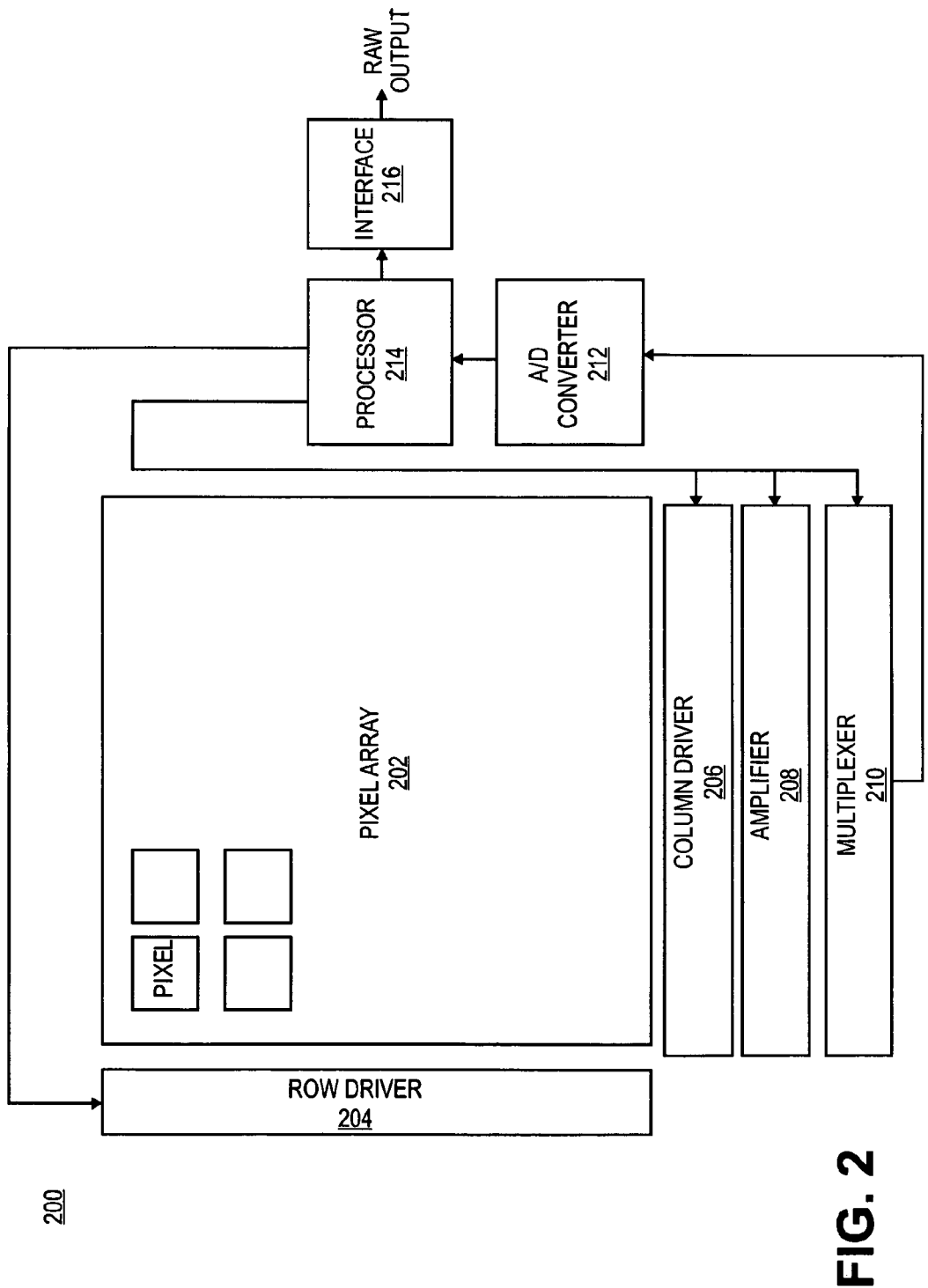
FIG. 2 is a diagram illustrating an exemplary image sensor consistent with embodiments of the present teaching.

FIG. 2 illustrates an exemplary imaging unit 200 that is in accordance with embodiments of the present teaching. For example, imaging unit 200 may be used as imaging unit 102 in image sensor 100. It should be readily apparent to those of ordinary skill in the art that imaging unit 200 illustrated in FIG. 2 represents a generalized schematic illustration and that other components may be added or existing components may be removed or modified.

As shown in FIG. 2, imaging unit 200 may comprise a pixel array 202, a number of row drivers 204, a number of column drivers 206, a number of amplifiers 208, a multiplexer 210, an analog to digital converter (ADC) 212, a processor 214, and an interface circuit 216. These components may be implemented using hardware, firmware, software, or combination thereof that are known to those skilled in the art and will now be further described.

Pixel array 202 provides an array of sensors that collects photons of light (from an object or scene) that are to be recorded in an image. In general, pixel array 202 is divided into elements, i.e., pixels that make up the recorded image. Typically, pixel array 202 is a two-dimensional array made up of rows and columns of pixels that comprise one or more photosensitive detectors (not shown). The detectors may be complementary metal oxide semiconductor devices or charge coupled devices, which are both known to those skilled in the art.

Because the detectors in each pixel merely produce a charge that is proportional to the amount of light that strikes them, pixel array 202 may comprise one or more additional layers. For example, if imaging unit 200 is intended to provide color images, then pixel array 202 may comprise a color filter that overlays the sensors. Known color filters may employ patterns of red, green, and blue colors, such as a Bayer pattern. Other known color filters may employ other colors, such as cyan, magenta, and yellow. One skilled in the art will realize that any of these types of color filters or other color filters may be implemented in the embodiments of the present teaching.

Row driver 204 comprises the circuitry and other related hardware for driving one or more rows of pixels in pixel array 202. Column driver 206 comprises the circuitry and other related hardware for driving one or more columns of pixels in pixel array 202. The various parts used for row driver 204 and column driver 206 are known to those skilled in the art. One skilled in the art will realize that any hardware, firmware, software, or combination thereof may be utilized.

Amplifier 208 comprises the circuitry and other related hardware for amplifying the output of pixel array 202 to an appropriate voltage level. The components and hardware used for amplifier 208 are known to those skilled in the art. One skilled in the art will realize that any hardware, firmware, software, or combination thereof capable of amplifying an electrical signal may be utilized.

Multiplexer 210 provides circuitry selecting various portions, e.g., columns, of pixel array 202 and, in some embodiments, circuitry for measuring the output of pixel array 202. For example, multiplexer 210 may connect in parallel sub-divisions on different pixels that correspond to the same transformation coefficient or partial coefficient. Accordingly, the output of multiplexer 210 will be proportional to the transformation coefficients used for creating a JPEG image. Such circuitry is known to those skilled in the art. One skilled in the art will realize that any hardware, firmware, software, or combination thereof capable of multiplexing an electrical signal may be utilized.

ADC 212 comprises the hardware and software for converting the analog output of pixel array 202 into digital form. Such hardware and software are known to those skilled in the art. One skilled in the art will realize that any hardware, firmware, software, or combination thereof capable of converting an analog signal to a digital signal may be utilized.

Processor 214 comprises the hardware, firmware, software, or combination thereof for controlling the operation of image sensor 202. Processor 214 may be implemented using known circuitry and/or components. For example, processor 214 may be configured (or programmed) to provide the raw output of pixel array 202. In some embodiments, the raw output of pixel array 202 provides an image in compressed form, such as in the form of JPEG transformation coefficients.

Processor 214 may also provide other data or metadata. For example, processor 214 may provide metadata for de-mosaicing color information from pixel array 202, white balance data, calorimetric interpretation data, gamma correction data, and noise reduction data. Such metadata is known to those skilled in the art.

Furthermore, processor 214 may provide another resource for further compression of the data from imaging unit 200. For example, processor 214 may be configured to perform Huffman coding, run-length encoding, and zig-zag scanning.

Interface circuit 216 comprises the hardware for interfacing image sensor 100 to another device, such as a memory, or communications bus. Interface circuit 216 may be implemented using known components of hardware and/or communications standards. One skilled in the art will realize that any hardware, firmware, software, or combination thereof capable of interfacing with other devices may be utilized.

Returning to FIG. 1, image sensor 100 also includes a filter 108. Filter 108 may be a set of individual filters. Likewise, filter 108 may be a single filter with multiple divisions with different properties. Filter 108 may be composed of any material capable of changing properties of light passing through filter 108. For example, filter 108 may be composed of an opaque material that changes the amount of light passing through filter 108. One skilled in the art will realize that filter 108 may be composed of any known material capable of changing the properties of light.

Filter 108 performs "front-end" processing on light passing through filter 108. Filter 108 transforms light passing though filter 108 such that light captured by sensor array 104 would represent data of a compressed image. To transform the light, filter 108 may have different transmissivities for the different divisions or different filters. The transmissivities may be related to a coefficient or partial coefficient of an image transform or compression algorithm. For example, the transform or compression algorithm may be JPEG or MPEG.

As mentioned above, filter 108 may be composed of multiple divisions or be multiple individual filters. Each division of filter 108 (or individual filter) is positioned adjacent to a sensor of sensor array 104. Each division of filter 108 (or individual filter) may be configured to alter light passing through to the corresponding sensor of sensor array 104.

Each division of filter 108 (or individual filter) may be further divided into sub-divisions. Each sub-division of filter 108 (or individual filter) may be aligned with sub-divisions of sensors of sensor array 104. Sub-divisions of sensor array 104 may be physical divisions of sensor array 104, such as photodiode silicon sub-divisions. For example, each sub-division 108 (or individual filter) may be aligned with pixel sub-divisions of pixel array 202. Each sub-division of an individual sensor in sensor array 104 represents a coefficient or partial coefficient of a compression or transform algorithm.

Each sub-division of filter 108 (or individual filter) transforms the light illuminating sensor array 104 into a data representing a coefficient or partial coefficient of the compression or transform algorithm. As such, sensor array 104 generates data that represents a compressed or transformed image. Processing device 106 then records the data without having to perform further processing on the imaging signal.

Figure 3:
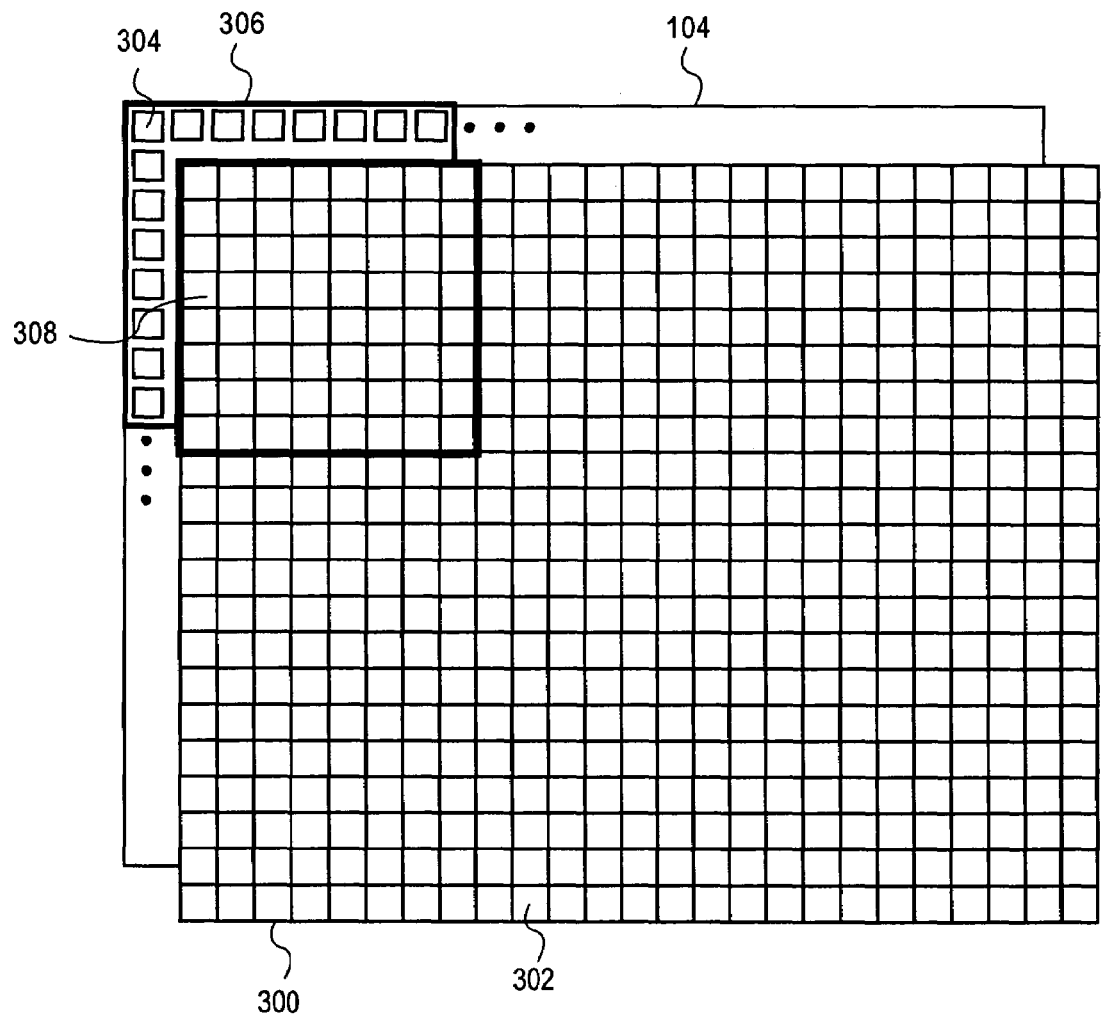
FIGS. 3 and 4 are diagrams illustrating a exemplary filter consistent with embodiments of the present teaching.
Figure 4:
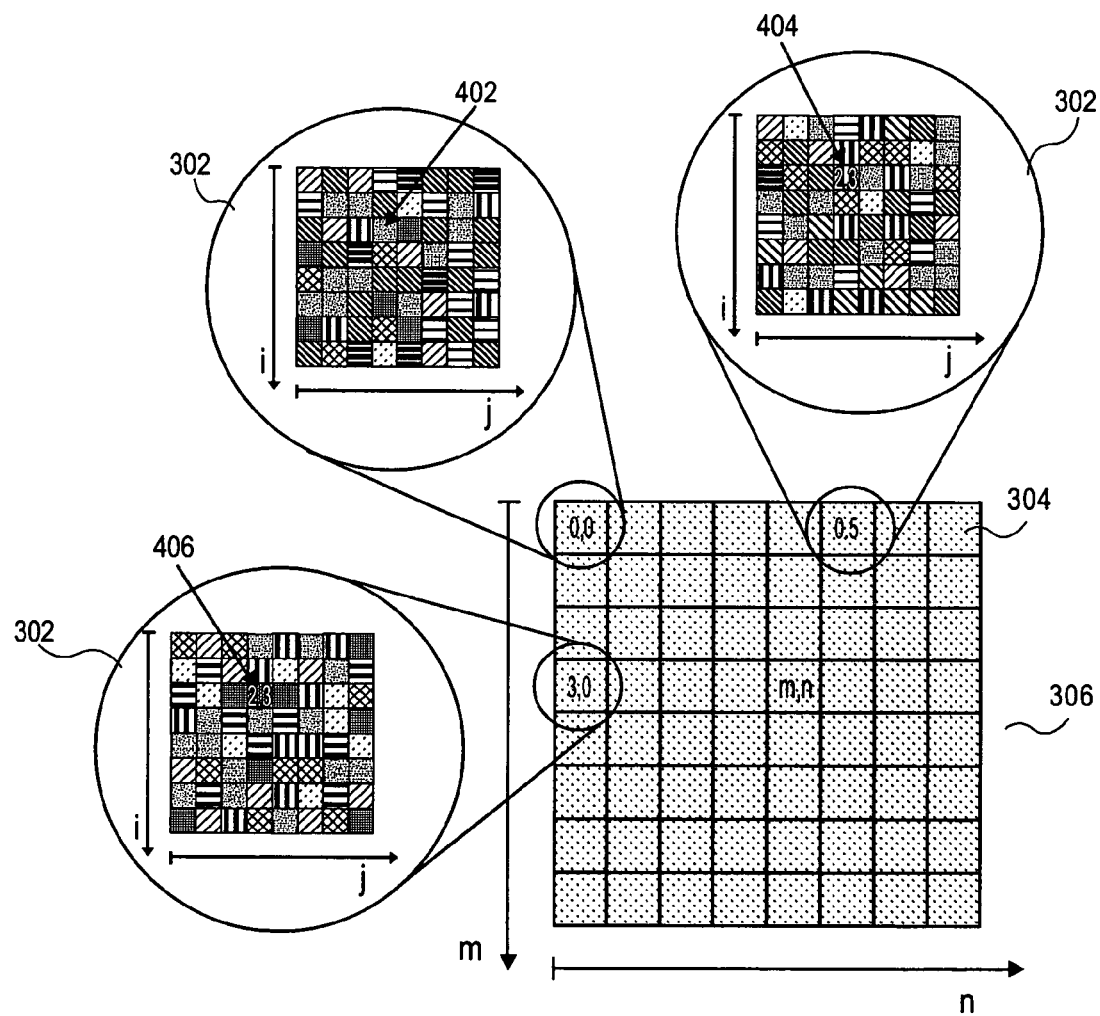

FIGS. 3 and 4 illustrate an exemplary filter 300 which may be used in imaging device 100 including an imaging unit 102. Filter 300 is configured to be used with transform encoding such as the JPEG compressing algorithm or MPEG. Filter 300 alters the light striking imaging array 102 such that the imaging array detects the transformation coefficients of the JPEG algorithm. It should be readily apparent to those of ordinary skill in the art that filter 300 illustrated in FIGS. 3 and 4 represents generalized schematic illustrations and that other components may be added or existing components may be removed or modified.

The JPEG algorithm is designed to compress either color or grey-scale digital images. Conceptually, JPEG compresses a digital image based on a mathematical tool known as the DCT and empirical adjustments to account for the characteristics of human vision.

The basic DCT can be expressed by the formula:

$$D(i,j) = \frac{2}{\sqrt{MN}} C(i)C(j) \sum_{m=0}^{m=M-1} \sum_{n=o}^{n=N-1} p(m,n)\cos\left[\frac{(2m+1)i\pi}{2M}\right]\cos\left[\frac{(2n+1)j\pi}{2N}\right]$$

where C(i) and C(j) coefficients are:

$$C(k)=1/\sqrt{2} \text{ (for k=0), or =1 (for k>0); and}$$

where p(m,n) represents the pixel values, either intensity or color.

JPEG applies the DCT to an elementary image area (called an "image block") that are 8 pixels wide and 8 lines high. This causes the basic DCT expression to simplify to:

$$D(i,j) = \frac{1}{4} C(i)C(j) \sum_{m=0}^{m=7} \sum_{n=o}^{n=7} p(m,n)\cos\left[\frac{(2m+1)i\pi}{16}\right]\cos\left[\frac{(2n+1)j\pi}{16}\right]$$

Therefore, in essence, JPEG uses the DCT to calculate the amplitude of spatial sinusoids that, when superimposed, can be used to recreate the original image.

In order to compress the data for an image, JPEG also combines a set of empirical adjustments to the DCT. The empirical adjustments have been developed through experimentation and may be expressed as a matrix of parameters that synthesizes or models what a human vision actually sees and what it discards. Through research, it was determined that a loss of some visual information in some frequency ranges is more acceptable than others. In general, human eyes are more sensitive to low spatial frequencies than to high spatial frequencies. As a result, a family of quantization matrices Q was developed. In a Q matrix, the bigger an element, the less sensitive the human eye is to that combination of horizontal and vertical spatial frequencies. In JPEG, quantization matrices are used to reduce the weight of the spatial frequency components of the DCT processed data, i.e., to model human eye behavior. The quantization matrix $Q_{50}$ represents the best known compromise between image quality and compression ratio and is presented below.

$$Q_{50} = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

For higher compression ratios, poorer image quality, the $Q_{50}$ matrix can be multiplied by a scalar larger than 1 and clip all results to a maximum value of 255. For better quality images, but less compression, the $Q_{50}$ matrix can be multiplied by a scalar less than 1.

Therefore, the JPEG algorithm can be expressed as the following equation:

$$K(i,j) = \frac{1}{4} \frac{C(i)C(j)}{Q(i,j)} \sum_{m=0}^{m=7} \sum_{n=o}^{n=7} p(m,n) \cos\left[\frac{(2m+1)i\pi}{16}\right] \cos\left[\frac{(2n+1)j\pi}{16}\right]$$

Of note, the application of the quantization matrix with the DCT essentially eliminates many of the frequency components of the DCT alone. The example below illustrates this phenomenon.

For clarity of presentation, the example is limited to a single 8×8 image block from a stock image. For example, suppose the image array I for a single image block is:

$$I = \begin{bmatrix} 170 & 153 & 153 & 153 & 160 & 160 & 153 & 134 \\ 170 & 153 & 153 & 160 & 160 & 160 & 153 & 134 \\ 170 & 110 & 153 & 160 & 160 & 153 & 153 & 134 \\ 160 & 110 & 134 & 165 & 165 & 153 & 134 & 110 \\ 160 & 134 & 134 & 165 & 160 & 134 & 134 & 110 \\ 165 & 134 & 134 & 160 & 223 & 134 & 110 & 134 \\ 165 & 134 & 160 & 196 & 223 & 223 & 110 & 134 \\ 165 & 160 & 196 & 223 & 223 & 254 & 198 & 160 \end{bmatrix}$$

Initially, it is noted that all values in the I matrix are positive. Therefore, before continuing, the apparent DC bias in the image can be removed by subtracting a value, such as 128, from the matrix I. A new matrix I' results and is provided below.

$$I' = \begin{bmatrix} 42 & 25 & 25 & 25 & 32 & 32 & 25 & 6 \\ 42 & 25 & 25 & 32 & 32 & 32 & 25 & 6 \\ 42 & -18 & 25 & 32 & 32 & 25 & 25 & 6 \\ 32 & -18 & 6 & 37 & 37 & 25 & 6 & -18 \\ 32 & 6 & 6 & 37 & 32 & 6 & 6 & -18 \\ 37 & 6 & 6 & 32 & 95 & 6 & -18 & 6 \\ 37 & 6 & 32 & 68 & 95 & 95 & -18 & 6 \\ 37 & 32 & 68 & 95 & 95 & 126 & 70 & 32 \end{bmatrix}$$

From matrix algebra, the application of the DCT to the image array I is equivalent to multiplying the DCT matrix T by the matrix I. The result may then be multiplied with the transpose of T. From the DCT definition, the elements of the T matrix can be calculated by the equation:

$$T(i,j) = \sqrt{\frac{2}{M}} C(i) \cos\left[\frac{(2j+1)i\pi}{2M}\right]$$

where i and j are row and column numbers from 0 to 7. For convenience, the T matrix is presented below.

$$T = \begin{bmatrix} 0.3536 & 0.3536 & 0.3536 & 0.3536 & 0.3536 & 0.3536 & 0.3536 & 0.3536 \\ 0.4904 & 0.4157 & 0.2728 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 0.3536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.0975 & -0.2778 & 0.4157 & -0.4904 & 0.4904 & -0.4157 & 0.2778 & -0.0975 \end{bmatrix}$$

Continuing now with JPEG, the DCT may be applied to the image matrix I' by multiplying it with T on the left and the transpose of T on the right. Rounding the result, the following matrix I'' is obtained.

$$I'' = \begin{bmatrix} 233 & 21 & -103 & 78 & 51 & 18 & 25 & 8 \\ -75 & 19 & 71 & -21 & -18 & 26 & -18 & 12 \\ 104 & -22 & -14 & 5 & -36 & -11 & 16 & -18 \\ -47 & 31 & 10 & -2 & 27 & -38 & -19 & 11 \\ 13 & -7 & 3 & -3 & -29 & 25 & -12 & -10 \\ -16 & -1 & -19 & 16 & 16 & -8 & 25 & -4 \\ 5 & -10 & 11 & -9 & 10 & 2 & -9 & 24 \\ -2 & 1 & 3 & -3 & -9 & 12 & 9 & -9 \end{bmatrix}$$

In order to consider the empirical data of human vision, each element of the I'' matrix is divided by the corresponding element of a quantization matrix and each result is rounded. For example, if quantization matrix $Q_{50}$ is used, the result I'' $Q_{50}$ is expressed below.

$$I''Q_{50} = \begin{bmatrix} 15 & 2 & -10 & 5 & 2 & 0 & 0 & 0 \\ -6 & 2 & 5 & -1 & -1 & 0 & 0 & 0 \\ 7 & -2 & -1 & 0 & -1 & 0 & 0 & 0 \\ -3 & 2 & 0 & 0 & 1 & 0 & 0 & 0 \\ 1 & 0 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Of note, most of the elements in the result matrix round off to 0. In particular, only 19 of the 64 transformation coefficients are non-zero values. That is, JPEG has eliminated those components that were too small to overcome the human eye's lack of sensitivity to their spatial frequency.

If the quality level is dropped by using a quantization matrix, such as $Q_{10}$, approximately only 7 nonzero coefficients remain. Likewise, if the quality level is increased by using a quantization matrix, such as $Q_{90}$, approximately 45 coefficients remain. Therefore, for the most part, the JPEG algorithm utilizes relatively few of the 64 possible transformation coefficients of the DCT.

The number of terms that may bring a non-negligible contribution to the value of K(i,j) depends of the desired fidelity of the image. For example, only 10 to 30 of these 64 terms may bring a non-negligible contribution to the value of K(i,j), with 20 being the most common number. The JPEG algorithm obtains compression replacing the measurement and transmission of 64 pixel values (for each 8×8 tile) with the calculation and transmission of K(i,j) coefficient values. For example, if only 20 of these 64 terms bring a non-negligible contribution to the value of K(i,j), only these 20 coefficient values may be used to represent the image.

As discussed above, at the core of the JPEG algorithm is the division of the DCT coefficients of 8×8 tiles of the image of interest by the experimentally determined quantization values Q(i,j).

Returning to FIG. 3, filter 300 is composed of divisions 302. Alternatively, divisions 302 may be individual separate filters. Divisions 302 of filter 300 are arranged to be matched up to sensors 304 in sensor array 104. For example, divisions 302 (or separate filters) may be matched up with pixels in sensor array 104. Filter 300 may be composed of any optical material capable of changing the amount of light passing through filter 300.

Sensors 304 in sensor array 104 may be grouped into a sensor block 306. For example, sensors 304 in sensor array 104 may be grouped into 8 by 8 sensor blocks, such as an 8 pixel sensor by 8 pixel sensor block. Likewise, divisions 302 (or separate filters) may be grouped into blocks 308 which correspond to sensor block 306.

As discussed above, at the core of the JPEG algorithm is the division of the DCT coefficients of 8×8 tiles of the image of interest by the experimentally determined quantization values Q(i,j).

The resulting coefficients K(i,j) are given by:

$$K(i,j) = \frac{1}{4} \frac{C(i)C(j)}{Q(i,j)} \sum_{m=0}^{m=7} \sum_{n=0}^{n=7} p(m,n) \cos\frac{(2m+1)i\pi}{16} \cos\frac{(2n+1)j\pi}{16}$$

Where:
p(m,n) is the pixel illumination at the position m,n (within the 8×8 tile), Q(i,j) measures the eye sensitivity at the spatial frequencies i and j, and C(k) is given by:

$$C(k) = \begin{cases} \frac{1}{\sqrt{2}} & \text{for } k = 0 \\ 1 & \text{for } k > 0 \end{cases}.$$

As stated above, to implement the proper transformation coefficients or partial coefficients, sensors 304 of sensor array 104 may be divided into sub-divisions. Sub-divisions of sensors 304 in sensor array 104 may be physical divisions of sensor array 104, such as sub-pixels of pixel sensors. For example, the sub-divisions of the sensors may silicon sub-divisions of sensor array 104.

To alter light striking the sub-divisions of the sensors 304, divisions 302 of filter 300 (or separate filters) may be subdivided. The sub-divisions of divisions 302 of filter 300 may be arranged to match the corresponding sub-divisions of sensors 304 in sensor array 104.

FIG. 4 illustrates an exemplary sensor block 306 which is composed of an 8×8 group of sensors 304 in sensor array 104. As illustrated in FIG. 4, a sensor 304 may be located at a position m,n in sensor block 306.

As mentioned above, each sensor 304 of sensor array 104 may be sub-divided into sub-divisions. The number of the sub-divisions of each sensor 304 may be equal to the number of JPEG coefficients K(i,j) desired for the compression or transformation. As illustrated in FIG. 4, sensor block 306 may include a group of 8 sensors 304 by 8 sensors 304, 64 sensors total. If the number of JPEG coefficients desired is 64, each sensor 304 may be divided in 64 sub-divisions. For example, the photodiode silicon may be sub-divided into 64 sub-divisions.

In order to alter light detected by each sub-division of sensors 304, division 302 of filter 300 may be divided into an equal number of sub-divisions as sub-divisions of sensors 304. Accordingly, as illustrated in FIG. 4, each division 302 (or separate filter), may be divided into 64 sub-divisions, such as sub-divisions 402, 404, and 406. The sub-divisions of divisions 302 of filter 300 (or separate filters) may be positioned adjacent to a corresponding sub-division of sensor 304. Accordingly, each sub-division of division 302 (or separate filter) may alter light striking a sub-division of sensor 304 of sensor array 104.

Since sub-divisions of sensors 304 in sensor block 306 correspond to transformation coefficients or partial coefficients, the corresponding sub-divisions of divisions of filter 300 alter the light striking the sub-division of sensor 304 so that sensors 304 may measure a signal proportional to transformation coefficients or partial coefficients. To achieve this, each corresponding sub-division of divisions of filter 300 may have transmissivity related to the transformation coefficient or partial coefficient of the corresponding sub-division of sensor 304. As such, sub-divisions of divisions of filter 300 may alter light striking the corresponding sub-division of sensors 304 so that sensors 304 capture light proportional to the transformation coefficient or partial coefficient.

For the JPEG algorithm, sub-divisions (or separate filters) of divisions of filter 300, for example sub-divisions 402, 404, and 406, may have a transmissivity depending of location, m,n, in the sensor block 306, and location of the sub-division, i,j, in division 302. The transmissivity of a given sub-division, depending of location, may be proportional to:

$$\frac{C(i)C(j)}{Q(i,j)}\cos\frac{(2m+1)i\pi}{16}\cos\frac{(2n+1)j\pi}{16}$$

As such, light passing through filter 300 may be transformed into a signal that is proportional to the transformation coefficient K(i,j).

The value of a particular transform coefficient, for example K(2,3), may be determined by summing the contribution of all the corresponding sub-divisions of sensors 304 in sensor block 306. For example, coefficient K(2,3) would be given by $$K(2,3) = \frac{1}{4}\frac{G}{24}\sum_{m=0}^{m=7}\sum_{n=0}^{n=7} p(m,n)\cos\frac{(2m+1)2\pi}{16}\cos\frac{(2n+1)3\pi}{16}$$

where G is a system-wide gain.

In such a case, for example, sub-division 402 (or separate filter) would have a transmissivity of $$\frac{C(i)C(j)}{Q(i,j)}\cos\frac{\pi}{8}\cos\frac{3\pi}{16}.$$

Sub-division 404 (or separate filter) would have a transmissivity of $$\frac{C(i)C(j)}{Q(i,j)}\cos\frac{\pi}{8}\cos\frac{33\pi}{16}.$$

Sub-division 404 (or separate filter) would have a transmissivity of $$\frac{C(i)C(j)}{Q(i,j)}\cos\frac{7\pi}{8}\cos\frac{33\pi}{16}.$$

Accordingly, the value measured by sensor array 104 for each sub-division i=2 j=3 of sensors 304, all within the 8×8 block, when summed, would be equal to the transform coefficient K(2,3) for 8×8 sensor block 306. In general, the value measured by sensor array 104 for corresponding sub-divisions i,j of sensors 304, all within the 8×8 block, when summed, would be equal to the transform coefficient K(i,j) for 8×8 sensor block 306. As such, corresponding sub-divisions for every sensor 304 in 8×8 sensor block 306 would be summed to obtain every transformation coefficient for sensor block 306. Thus, the information captured by sensor array 104 would represent a compressed or transformed image without further processing.

FIG. 4 illustrates 64 sub-divisions of sensor 304 and 64 sub-divisions of division 302 of filter 300 which corresponds to 64 transformation coefficients K(i,j). Sensors 304 in sensor array 104 and division 302 in filter 300 (or separate filters) may be divided into smaller number of sub-divisions, such as 20, if only 20 coefficients or partial coefficients are required. One skilled in the art will realize that sensors 304 in sensor array 104 and filter 300 may be divided into any number of sub-divisions depending on the desired number of transformation coefficients or partial coefficients and the transformation algorithm utilized.

One skilled in the art will also realize that any transformation or compression algorithm may be utilized to determine the number of sub-division of sensors 304 and the transmissivities of filter 300. For example, the number of sub-division of sensors 304 and the transmissivities of filter 300 may be related to transformation values in the MPEG algorithm.

Figure 5:
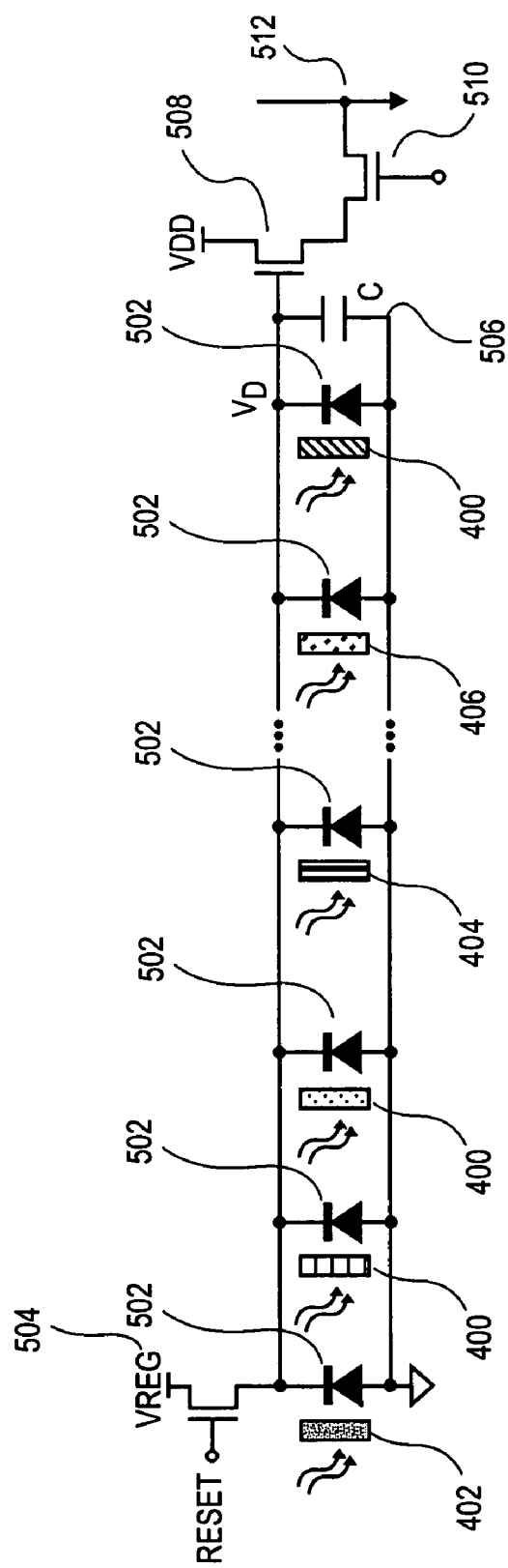
FIG. 5 is a diagram illustrating a exemplary measuring circuit consistent with embodiments of the present teaching.

Since the signal generated by each sensor of sensor array 104 represent a transform coefficient or partial coefficients, all the signals of different divisions for a particular sub-section must be added. FIG. 5 is a schematic diagram illustrating a measuring circuit for accumulating the measured transform coefficients or partial coefficients for a block of sensors in the sensor array. FIG. 5 illustrates a circuit 500 for the transform coefficient K(2,3). It should be readily apparent to those of ordinary skill in the art that circuit 500 illustrated in FIG. 5 represents a generalized schematic illustration and that other components may be added or existing components may be removed or modified. Further, one skilled in the art will realize that imaging device 100 would have a measuring circuit 500 for each different transform coefficient K(i,j) in a block.

As illustrated in FIG. 5, circuit 500 comprises sensor sub-division elements 502, such as sensor sub-pixel elements. For example, sensor sub-division elements 502 may be photodiodes. All sensor sub-division element 502 residing on different physical pixels, but corresponding to the same K(i,j) coefficient are coupled in parallel. Sensor sub-division elements 502 are coupled to a transistor 504, a capacitor 506, a transistor 508, and a transistor 510. These allow the selection and reading of signals for sensor sub-division elements 502.

As illustrated in FIG. 5, each sensor sub-division element 502 is placed behind a sub-division 400 (or separate filter). In this case, each sensor sub-division element 502 is placed behind sub-division 400 (or separate filter) corresponding to K(2,3), such as sub-divisions 402, 404, and 406 (or separate filters). The signals detected by sensor sub-division elements 502 are output on output line 512. The output of output line 512 is a voltage proportional to the K(2,3) JPEG coefficient.

Figure 6:
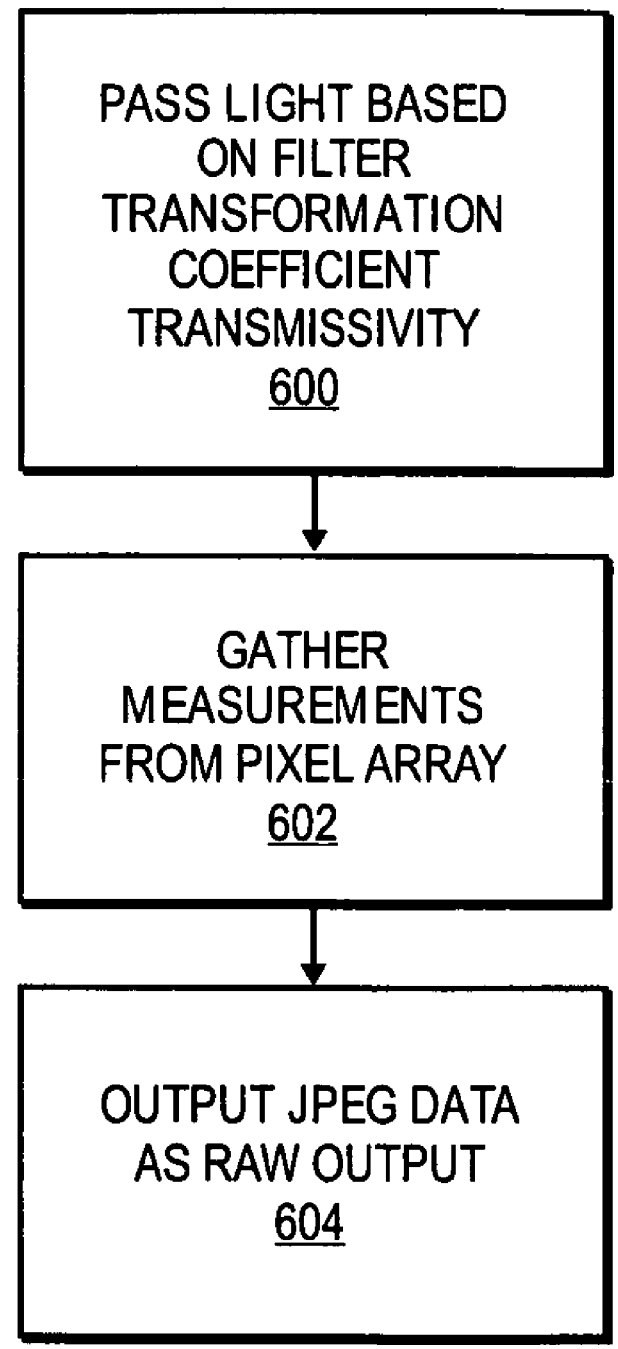
FIG. 6 is a diagram illustrating an exemplary process flow consistent with embodiments of the present teaching.

FIG. 6 illustrates an exemplary process flow that is in accordance with an embodiment of the present teaching. For example, the process may be performed on image sensor 100 which includes an imaging unit 200 and filter 300. In stage 600, image sensor 100 is exposed to light and the light is passed through filter 300. Filter 300 is configured as illustrated above such that sub-divisions of filter 300 (or separate filters) have transmissivities that are related to coefficients or partial coefficients in a compression or transform algorithm as mentioned above.

As light passes through filter 300, photons may strike respective divisions composed of the sub-divisions elements of pixel array 202. In response, the sub-division elements of pixel array 202 provide a voltage output that is proportional to the amount of light striking that division and the transformation coefficients or partial coefficients overlaying the pixels. Processing may then flow to stage 602.

In stage 602, multiplexer 210 may gather the measurements from pixel array 102. For example, multiplexer 210 may gather various signals that correspond to the different transformation coefficients or partial coefficients for a pixel block and provide a single, accumulated output that is proportional to the transformation coefficients used by the JPEG algorithm. For example, multiplexer 210 may be coupled to output line 512 various measuring circuits 500 for a pixel block. As such, multiplexer 210 may gather the signals representing all the transformation coefficients or partial coefficients for a pixel block.

In stage 604, ADC 212 converts the measurements from pixel array 202 and converts them into digital data. Processor 214 may then receive the digital data and format it into JPEG data or a JPEG data as the raw output of imaging device 100.

Of course, processor 214 may perform other compression algorithms, such as run length encoding or Huffman coding. Zig-zag scanning may also be employed by processor 214.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. An image sensor configured to output transformed image data, the image sensor comprising:
   a set of pixel sensors that are sensitive to light; and
   a set of filter elements positioned adjacent to the set of pixel sensors,
   wherein each pixel sensor of the set of pixel sensors comprises a sub-division of a pixel and each filter element of the set of filter elements comprises a sub-division corresponding to the sub-divisions of the adjacent pixel sensor, each filter element subdivision having transmissivity related to at least a partial coefficient of an image compression transform,
   wherein the set of filter elements transforms light striking the set of pixel sensors to enable the image sensor to output transformed image data.

2. The image sensor of claim 1, wherein the set of pixel sensors and the set of filter elements are arranged in pixel blocks.

3. The image sensor of claim 2, further comprising:
   measuring circuits coupled to corresponding sub-divisions of different pixels sensors in a pixel block.

4. The image sensor of claim 2, wherein the pixel blocks comprise a block of 8 pixel sensors by 8 pixel sensors.

5. The image sensor of claim 2, wherein each pixel sensor of the set of pixel sensors comprises 8 sub-divisions by 8 sub-divisions.

6. The image sensor of claim 2, wherein each pixel sensor of the set of pixel sensors comprises less than 8 sub-divisions by 8 sub-divisions.

7. The image sensor of claim 2, wherein the at least the partial coefficient is a term of product terms in sub-terms of a sum of products transform.

8. The image sensor of claim 7, wherein the sum of products transform is defined by the JPEG compression algorithm.

9. The image sensor of claim 7, wherein the sum of products transform is defined by the MPEG compression algorithm.

10. The image sensor of claim 3, wherein the measuring circuits accumulate a signal from the corresponding sub-divisions.

11. An imaging device configured to provide transformed image data by transforming light captured by the imaging device, the imaging device comprising:
    a set of sensors that are sensitive to light, wherein the sensors are arranged in sensor blocks and each sensor of the set of sensors comprises sub-divisions of a pixel;
    a set of filter elements positioned adjacent to the set of sensors, each filter element of the set of filter elements comprising sub-divisions corresponding to the sub-divisions of a pixel in an adjacent sensor, each filter subdivision having transmissivities related to at least a partial coefficient of an image compression transform; and
    a set of measuring circuits coupled to the set of sensors, wherein each measuring circuit is coupled to corresponding sub-divisions of different sensors in a sensor block.

12. The imaging device of claim 11, wherein each sensor of the set of sensors comprises 8 sub-divisions by 8 sub-divisions.

13. The imaging device of claim 11, wherein each sensor of the set of sensors comprises less than 8 sub-divisions by 8 sub-divisions.

14. The imaging device of claim 11, wherein the at least the partial coefficient is a term of product terms in sub-terms of a sum of products transform.

15. The imaging device of claim 11, further comprising:
    a processor configured to output the transformed image data as a JPEG file.

16. The imaging device of claim 11, further comprising:
    a processor configured to output the transformed image data as a MPEG file.

17. A method of providing an image in transformed form, the method comprising:
    passing light for an image through a set of filter elements to a corresponding set of pixel sensors, each pixel sensor comprising a subdivision of a pixel, wherein each filter element of the set of filter elements has a transmissivity related to at least a partial coefficient of an image compression transform and transforms light striking the set of pixel sensors to enable the image sensor to output compressed image data;
    gathering data from the set of pixel sensors based on the light passed through the set of filter elements; and
    providing the transformed data as raw output from the sensor array.

* * * * *